United States Patent [19]
Fleischer

[11] Patent Number: 5,806,866
[45] Date of Patent: Sep. 15, 1998

[54] CARGO ENHANCING METHOD AND APPARATUS

[76] Inventor: Jeff Fleischer, 1090 Coloma Rd., Placerville, Calif. 95667

[21] Appl. No.: 680,207

[22] Filed: Jul. 11, 1996

[51] Int. Cl.$^6$ .................................. B62B 1/00; B60P 7/06
[52] U.S. Cl. ............................................ 280/47.31; 296/43
[58] Field of Search ........................... 296/43; 280/47.31, 280/653, 47.331, 144, 145, 147, 143

[56] References Cited

U.S. PATENT DOCUMENTS

| | | | |
|---|---|---|---|
| 1,077,693 | 11/1913 | Faust | 280/147 |
| 2,760,812 | 8/1956 | Richner | 280/147 |
| 2,768,022 | 10/1956 | Pope | 280/47.18 |
| 4,055,354 | 10/1977 | Sharpe | 280/47.31 |
| 5,374,095 | 12/1994 | Ramseth | 296/32 |

*Primary Examiner*—Brian L. Johnson
*Assistant Examiner*—Jonathan E. Butts
*Attorney, Agent, or Firm*—Herbert C. Schulze

[57] ABSTRACT

A method and apparatus for providing a framework for a wheelbarrow or the like in order to increase the load carrying capacity characterized by the use of hook-like adapters on the framework which allow perfect cooperation between the framework and the wheelbarrow or the like using tension connectors between like frameworks and an adjustment feature which allows for adjustment of the angular relationship of the framework or the like and the wheelbarrow or the like.

1 Claim, 4 Drawing Sheets

CARGO ENHANCING METHOD AND APPARATUS

CROSS REFERENCE TO RELATED PATENT APPLICATIONS

There are no patent applications filed by me related to the within application.

BACKGROUND OF THE INVENTION

1. Field of the Invention

This invention is in the general field of cargo carrying vehicles;

The invention is more particularly in the field of attachments for enhancing or increasing the cargo carrying capacity of cargo carrying vehicles;

The invention is most particularly in the field of enhancing or increasing the cargo capacity of wheelbarrows and the like.

II. Description of the Prior Art

I am familiar with stakes which are placed in openings of the sides of pickup trucks and the like to increase the capacity of such vehicles. I am, also aware that cargo nets, screens, and the like are sometimes used to enclose loads of material carried in wheelbarrows and the like, which, thus may be considered to increase their capacity.

The present invention is distinct from the prior art known to me in that this invention utilizes a removable framework resting on the upper edges of wheelbarrows and the like, extending upwardly and outwardly, and held in position by tension straps passing under the wheelbarrow or by other fastener means. Additionally, provision is made for adjusting the angular relation of the framework.

SUMMARY OF THE INVENTION

Wheelbarrows and the like are used throughout the world for carrying cargo of a wide variety. Such cargo may be building supplies, household supplies, office supplies, garden supplies, and ordinary trash of most any nature.

Wheelbarrows and the like are generally quite limited in carrying capacity. They usually have shallow cargo carrying compartments. This causes some great limitation on their carrying capacity, particularly when used for such material as garden trash and the like which may consist of shrubbery trimmings and the like. Such material may be very light in weight, but very difficult to carry in large volume. Sometimes persons have attempted to increase the carrying capacity of such vehicles by wrapping burlap, or netting, or screen elements, or the like about the material. This is usually inconvenient and ineffective. Additionally, such improvisations frequently cannot work because the load may bulge too far out over the sides of the vehicles restricting the ability to pass through narrow passages, such as gates and the like.

I have now conceived and developed a unique method and apparatus for greatly enhancing, or increasing, the load carrying capacity of wheelbarrows and the like without the disadvantages of the prior improvisations.

I have accomplished this by providing a framework to rest upon the upper edges of the sides of the vehicle's cargo compartment and extend upwardly and outwardly therefrom. This framework is held in place by tension straps which pass under the cargo compartment. Additionally, provision is made to alter the angular relationship of the framework to the cargo compartment.

It is an object of this invention to increase the cargo capacity of a wheelbarrow or the like;

Another object is to increase the cargo capacity of a wheelbarrow or the like in such manner that the width of the increased cargo compartment may be controlled;

Another object is to provide means to increase the cargo capacity of a wheelbarrow or the like in such a way that cargo increasing means can be adapted to varying widths of wheelbarrows or the like.

The foregoing and other objects and advantages will become apparent to those skilled in the art upon reading the description of a preferred embodiment, which follows, in conjunction with a review of the appended drawings.

DESCRIPTION OF A PREFERRED EMBODIMENT

Figure 1:
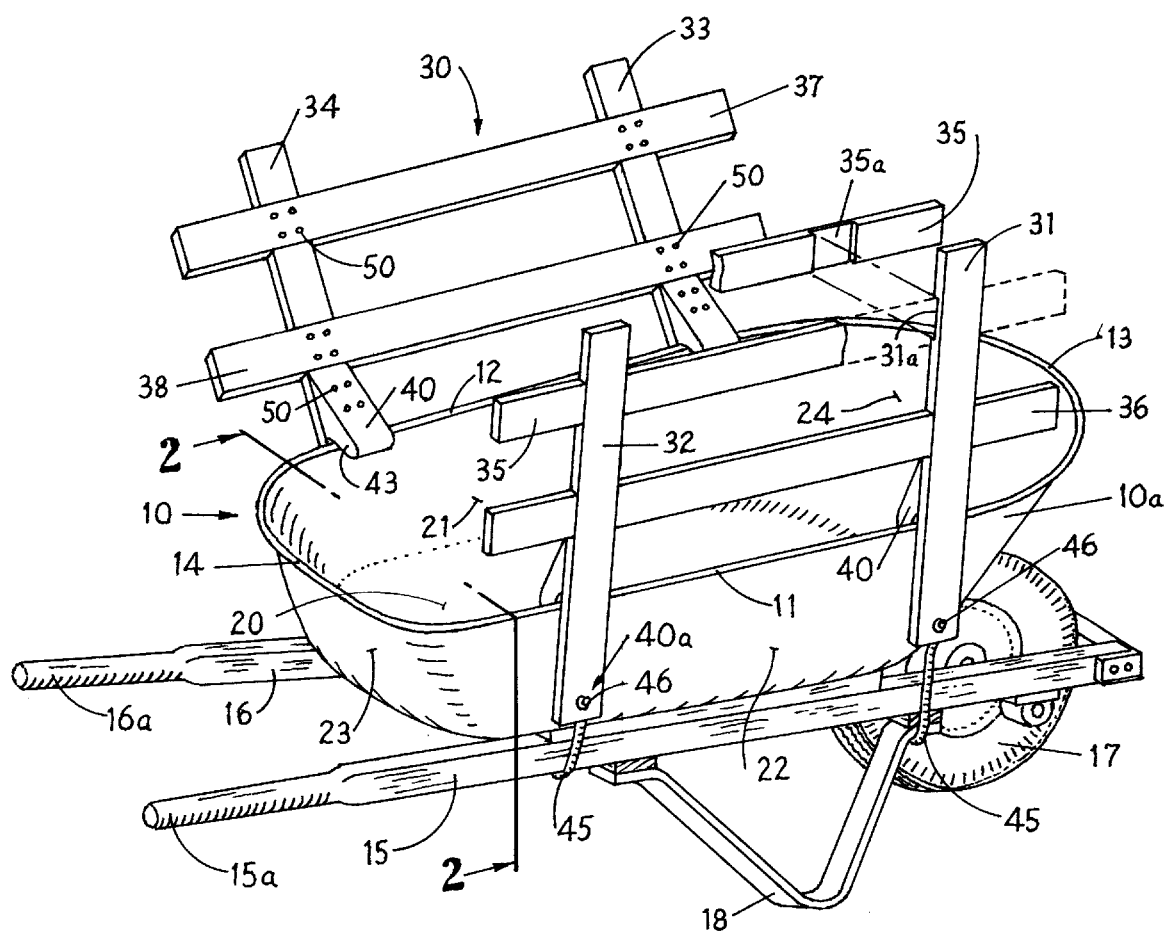
FIG. 1 is a perspective of a wheelbarrow with an apparatus suitable to practice the method of this invention with a partially exploded view of an interlocking of elements.

FIG. 1 shows a wheelbarrow 10 with a customary load tub 10a having sides 21 and 22, front end 24, rear end 23 and bottom 20. Customarily the tub 10a may be formed of one piece, or it may be welded or otherwise fabricated. Usually the top edges of the ends and sides will be rolled, or otherwise strengthened, as at 11, 12, 13 and 14. The tub is normally mounted to two beams 15 and 16, which carry handles 15a and 16a at the rear end. A wheel 17 and legs 18 and 19 will usually be mounted to the beams as shown. FIG. 1 shows an apparatus 30 suitable to perform the method of this invention. The apparatus 30 comprises two identical frameworks 30a, each consisting of two upright stake members 31 and 32 connected by two horizontal slats 35 and 36 fastened together by the use of nails 50, screws, adhesive, or the like. A specially formed support member 40 having a body 41 and hook-like appendage 43 is fastened to each upright 31 & 32 as shown by nails, screws, adhesive, or the like. The hook-like appendage is so shaped as to rest on the upper edges 11 and 12 of the tub. A hole 40a is provided near the end of each stake 31 and 32. An elastic cord 45 is fastened in each hole 40a by a knot 46 in one end, or otherwise. Each strap 45 carries a hook 47 or the like at its other end. In the partially exploded view there is revealed an interlocking arrangement between slat 35 and stake 31 so as to present a framework with completely flush members. Stake 31 is notched at 31a to receive slat 35 notched at 35a. It must be understood that I am attempting to present the most desirable form, however, the stakes and/or slats need not be notched to practice this invention.

Figure 2:
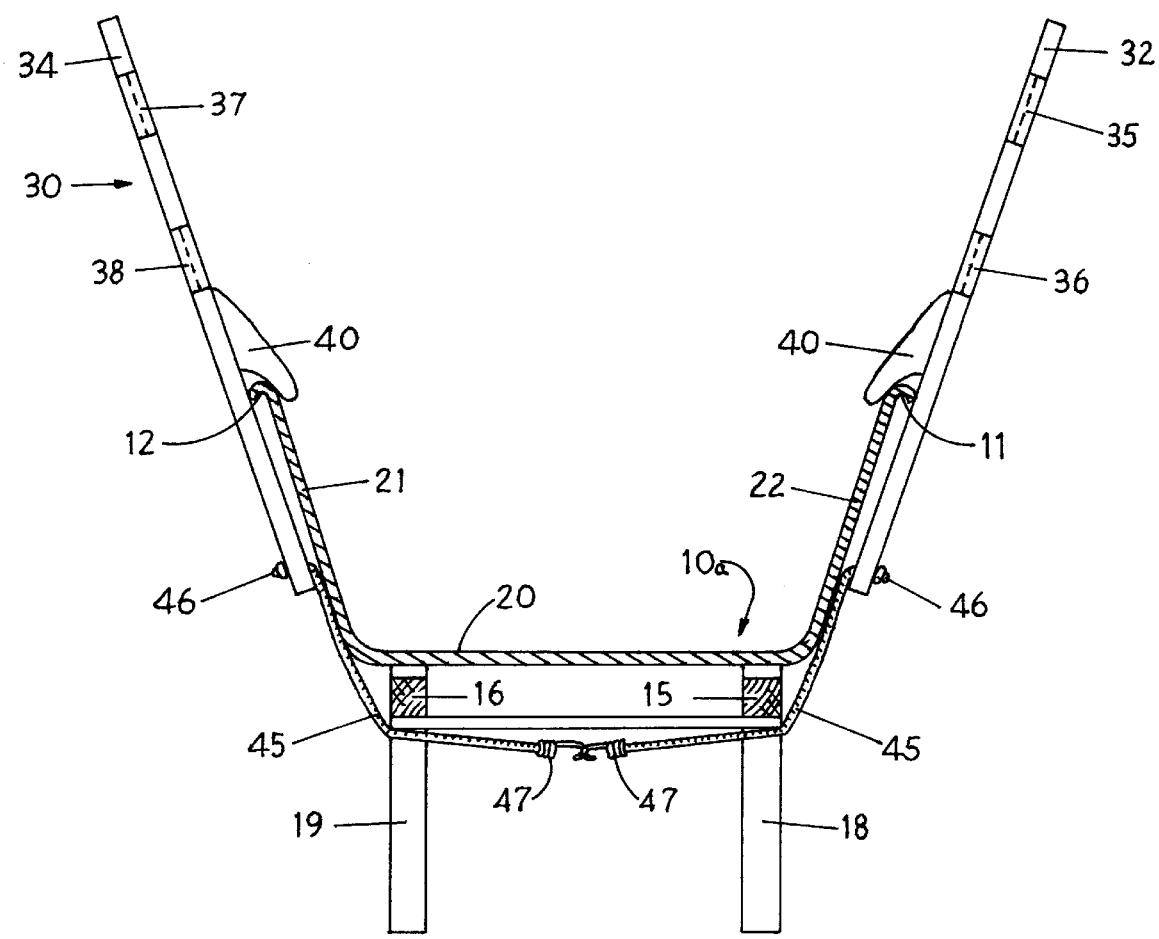
FIG. 2 is an enlarged partial sectional view on 2—2 of FIG. 1.
Figure 3:
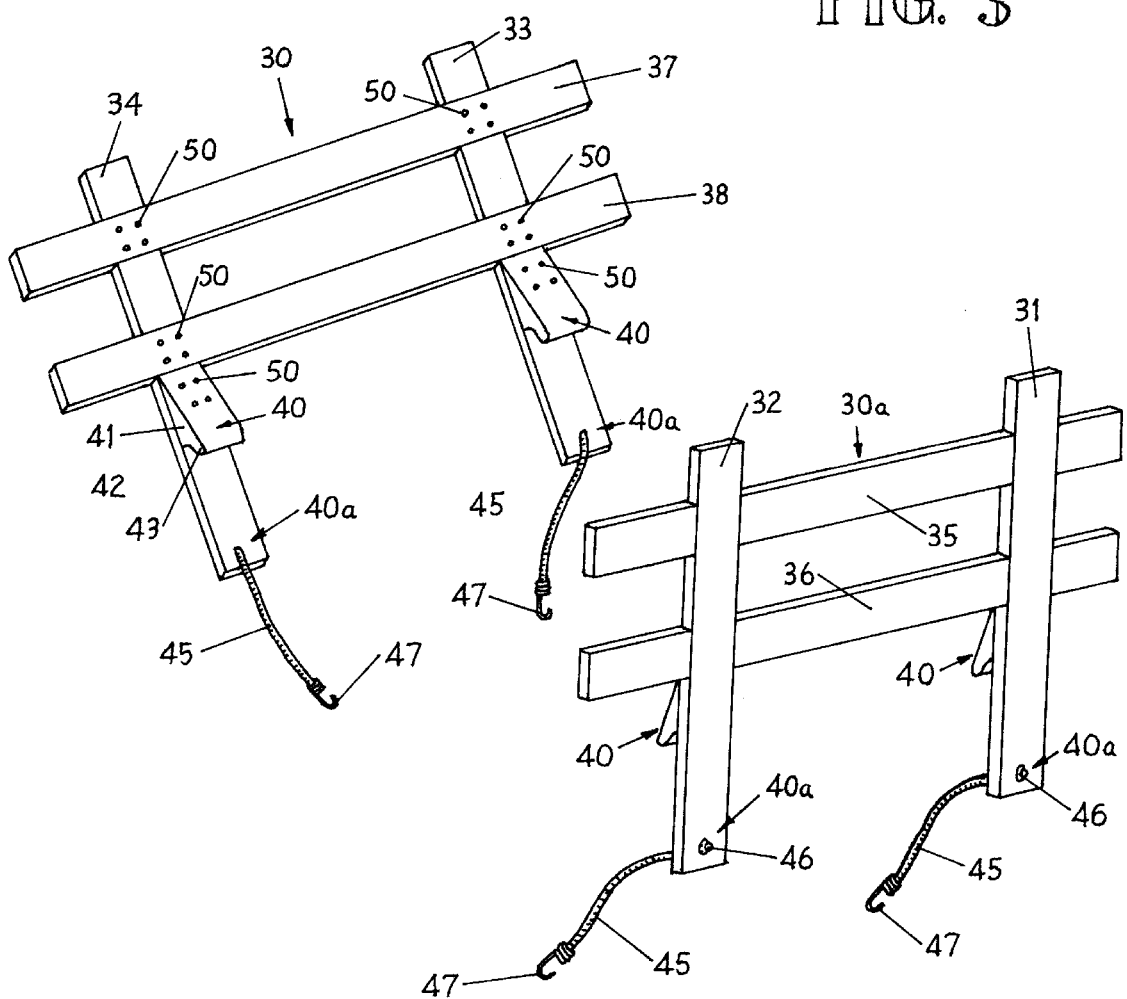
FIG. 3 is a perspective of the side elements of FIG. 1 removed from the wheelbarrow.

In use, the straps 45 will be hooked together in tension by hooks 47 as shown particularly well in FIG. 2. The straps 47 will pass under the beams 15 and 16 as shown. This provides an angularly disposed rack above the wheelbarrow or the like which will provide greatly increased load carrying capacity for most items, and particularly for waste material and the like.

Figure 4:
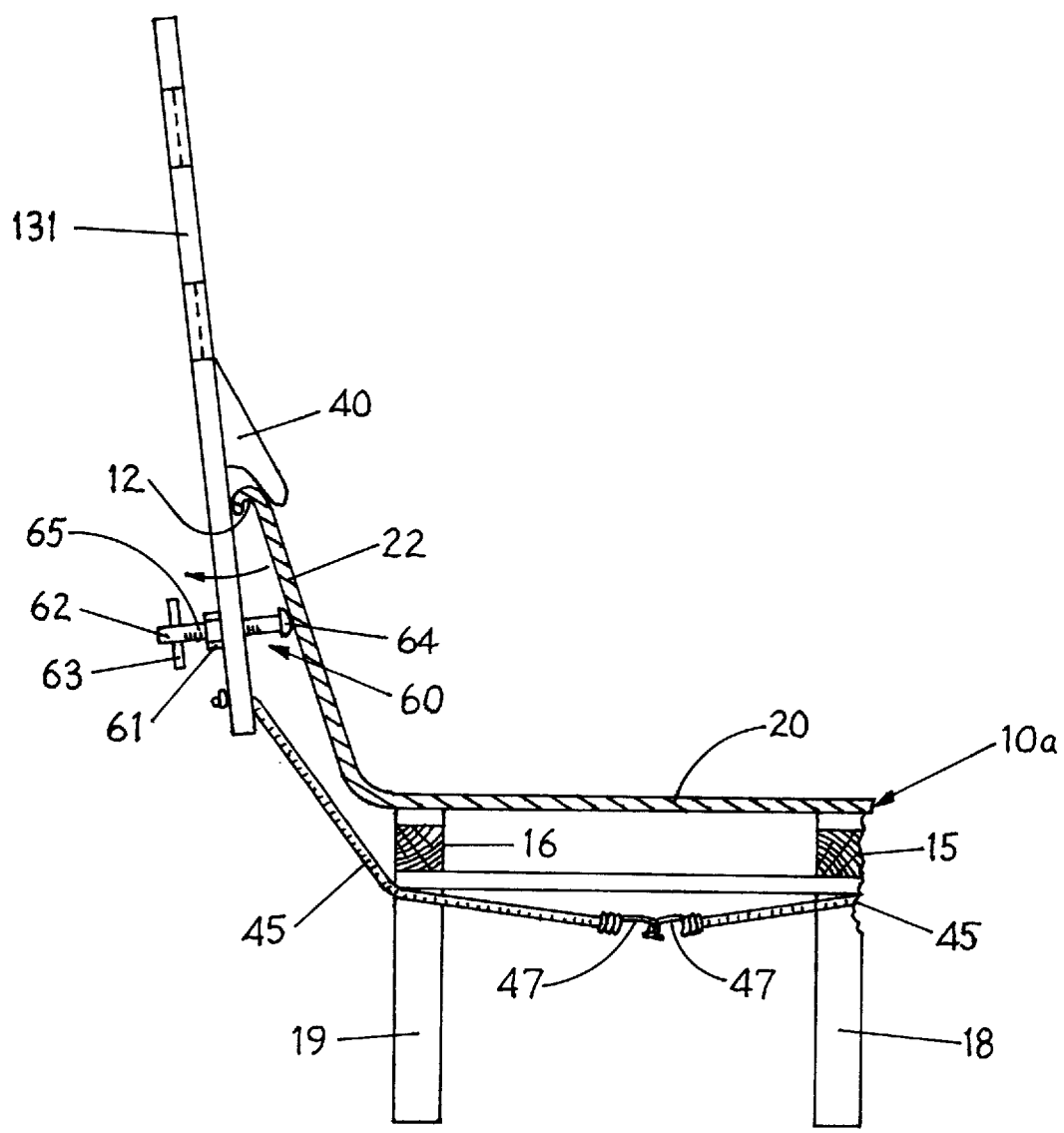
FIG. 4 is an enlarged partial, partially sectioned view, of an alternate embodiment of the area 4 of FIG. 2.

FIG. 4 is an important modification which can be made to the apparatus. In this case the upright stake 131 (the same for all stakes 31 and 32) has a hole at 60 with threaded rod or the like member 62 having handle 63, threads 65, and rounded end 64 extending through the hole. By turning the handle 63, the stake will be forced inwardly or outwardly from the wheelbarrow tub by the threaded rod moving within nut 61 or the like fastened to the stake 131 at the position of the hole 60. This will be particularly useful if the wheelbarrow or the like must pass through gates or the like having restricted clearance.

Throughout this application and in the claims and abstract which follow I have used, and will use, some terms such as "wheelbarrow", "beam", "tub" and the like. It is not my intention to be limited by these terms, since terms like "wagon", "support", "bed" and the like would be equally applicable. It is my intention to include, broadly, all variations, synonyms, and the like to the specific words used. Likewise, I have indicated the apparatus as described herein as being composed of stakes and slats and an appendage. It is entirely possible that this apparatus could be formed in one piece by molding a suitable material, or the like.

While the embodiments of this invention shown and described are fully capable of achieving the objects and advantages desired, it is to be understood such embodiments are for purposes of illustration only and not for purposes of limitation.

I claim:

1. Load enhancement apparatus for a wheelbarrow having a load carrying tub with an open top, a bottom, a front, a rear, a first side, a second side, an upper rim formed on the front, the rear, the first side, and the second side, the tub being supported by a wheel and two legs comprising: a first load enhancement member consisting of a first stake and a second stake, said first and second stakes each having an upper and a lower end, said first and second stakes being connected at a distance from each other by two parallel slats, each of said stakes carrying a hook-like appendage suitable to rest the stake upon the upper edge and against the exterior of the first side of the wheelbarrow at a point intermediate its upper and lower ends, and each of said hook-like appendages being so configured that it has a smooth surface over the hook-like portion which slopes downwardly over the hook-like portion toward the interior of the load carrying tub, and each of the stakes carries a width adjusting device comprising a threaded shaft threadedly engaged with each of said stakes at a position below the upper edge of the load carrying tub such that the threaded shaft can impinge upon the exterior of the first side of the load carrying tub in such manner that by rotation of the threaded shaft the angular relation of each stake to the load carrying tub may be adjusted independently of said angular relation of each stake in order to adjust the width of the load enhancement apparatus to allow for the wheelbarrow with the load enhancement apparatus to pass through differently sized openings such as gates; a second load supporting member comprising a first stake and a second stake, said first and second stakes each having an upper and a lower end, said first and second stakes being connected at a distance from each other by two parallel slats each of said stakes carrying a hook-like appendage suitable to rest the stake upon the upper edge and on the exterior of the second side of the wheelbarrow at a point intermediate its upper and lower ends, and each of said hook-like appendages being so configured that it has a smooth surface over the hook-like portion which slopes downwardly over the hook-like portion toward the interior of the load carrying tub, and each of the stakes carries a width adjusting device comprising a threaded shaft threadedly engaged with each of said stakes at a position below the upper edge of the load carrying tub such that the threaded shaft can impinge upon the exterior of the second side of the load carrying compartment in such manner that by rotation of the threaded shaft the angular relation of each stake to the load enhancement member may be adjusted independently of said angular relation of each other stake in order to adjust the width of the load enhancement apparatus to allow for the wheelbarrow with the load enhancement apparatus to pass through differently sized openings gates; elastic tensioning means fastened adjacent the bottom ends of the first stakes of the first and second load enhancement members and passing beneath the bottom of the wheelbarrow; and elastic tensioning means fastened adjacent the bottom ends of the second stakes of the first and second load enhancement members and passing beneath the bottom of the wheelbarrow.

\* \* \* \* \*